(12) United States Patent
Wang (10) Patent No.: US 11,544,794 B2
(45) Date of Patent: Jan. 3, 2023

(54) CLAIM SETTLEMENT METHOD AND APPARATUS EMPLOYING BLOCKCHAIN TECHNOLOGY

(71) Applicant: ADVANCED NEW TECHNOLOGIES CO., LTD., Grand Cayman (KY)

(72) Inventor: Shijie Wang, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 17/169,493

(22) Filed: Feb. 7, 2021

(65) Prior Publication Data

US 2021/0166326 A1    Jun. 3, 2021

Related U.S. Application Data

(63) Continuation of application No. PCT/CN2019/114356, filed on Oct. 30, 2019.

(30) Foreign Application Priority Data

Dec. 18, 2018 (CN) .......................... 201811548128.6

(51) Int. Cl.
*G06Q 40/08* (2012.01)
*G06Q 10/10* (2012.01)
(Continued)

(52) U.S. Cl.
CPC ............. *G06Q 40/08* (2013.01); *G06Q 10/10* (2013.01); *G06Q 20/401* (2013.01); *H04L 9/0643* (2013.01); *H04L 9/50* (2022.05)

(58) Field of Classification Search
CPC ...... G06Q 40/08; G06Q 10/10; G06Q 20/401; H04L 9/0463
See application file for complete search history.

(56) References Cited

U.S. PATENT DOCUMENTS 10,521,864 B1 * 12/2019 Davis ..................... G06Q 50/18
10,635,471 B2    4/2020 Davis et al.
(Continued)

FOREIGN PATENT DOCUMENTS

CN    108038786 A    5/2018
CN    108520462 A    9/2018
(Continued)

OTHER PUBLICATIONS

Nath, Indranil, "Data Exchange to fight Insurance Fraud on Blockchain", 2016 IEEE 16th International Conference on Data Mining Workshops, 2016, pp. 821-825 (Year: 2016).*

(Continued)

*Primary Examiner* — Mohammad Z Shaikh (57) ABSTRACT

One or more embodiments of this application provide a claim settlement method and apparatus employing blockchain technology, which are applied to a blockchain comprising a node device of an insurer and a node device of an insured party, a first smart contract for insurance claim settlement being deployed in the blockchain. The method comprises: acquiring a first transaction for making claim settlement payment to an insured party, wherein the first transaction comprises claim settlement event data corresponding to the insured party; and calling a first smart contract, executing an insurance claim settlement logic declared in the first smart contract and corresponding to the insured party, and performing, on the basis of the claim settlement event data, claim settlement processing with respect to the insured party.

20 Claims, 1 Drawing Sheet

Step 102 — Obtain a first transaction for settling a claim of the insured party, where the first transaction includes claim settlement event data corresponding to the insured party;

Step 104 — Call a first smart contract, execute an insurance claim settlement logic declared in the first smart contract and corresponding to the insured party, and perform claim settlement processing on the insured party based on the claim settlement event data.

(51) Int. Cl.
*G06Q 20/40* (2012.01)
*H04L 9/06* (2006.01)
*H04L 9/00* (2022.01)

(56) References Cited

U.S. PATENT DOCUMENTS

| | | | |
|---|---|---|---|
| 10,650,456 B2* | 5/2020 | Al-Masoud | G06Q 40/025 |
| 10,666,424 B1* | 5/2020 | Rutley | H04L 63/1416 |
| 10,679,221 B1* | 6/2020 | Rutley | G06F 16/951 |
| 10,733,616 B1* | 8/2020 | Rutley | G06F 16/5854 |
| 10,776,876 B1* | 9/2020 | Ketharaju | G06Q 20/367 |
| 10,776,879 B1* | 9/2020 | Floyd | G01D 9/00 |
| 10,824,759 B1* | 11/2020 | Magerkurth | H04L 9/0894 |
| 10,922,757 B2* | 2/2021 | Hu | G06F 16/27 |
| 10,949,926 B1* | 3/2021 | Call | G06Q 40/08 |
| 11,023,981 B2* | 6/2021 | Hu | G06F 16/245 |
| 11,188,874 B2* | 11/2021 | Ma | H04L 9/0618 |
| 11,216,788 B1* | 1/2022 | Vijayaraghavan | G06Q 20/405 |
| 2003/0028404 A1* | 2/2003 | Herron | G06Q 40/02 705/4 |
| 2011/0320226 A1* | 12/2011 | Graziano | G06Q 10/10 705/4 |
| 2015/0206106 A1 | 7/2015 | Yago | |
| 2015/0332283 A1* | 11/2015 | Witchey | H04W 12/02 705/3 |
| 2015/0379510 A1 | 12/2015 | Smith | |
| 2016/0217532 A1* | 7/2016 | Slavin | G06Q 30/0276 |
| 2016/0292672 A1 | 10/2016 | Fay et al. | |
| 2017/0132620 A1 | 5/2017 | Miller et al. | |
| 2017/0213289 A1 | 7/2017 | Doney | |
| 2017/0243177 A1* | 8/2017 | Johnsrud | G06Q 20/10 |
| 2017/0352027 A1 | 12/2017 | Zhang et al. | |
| 2018/0005186 A1 | 1/2018 | Hunn | |
| 2018/0060496 A1* | 3/2018 | Bulleit | H04L 9/3268 |
| 2018/0075527 A1 | 3/2018 | Nagla et al. | |
| 2018/0089758 A1 | 3/2018 | Stradling et al. | |
| 2018/0091316 A1 | 3/2018 | Stradling et al. | |
| 2018/0129945 A1 | 5/2018 | Saxena et al. | |
| 2018/0218176 A1 | 8/2018 | Voorhees et al. | |
| 2018/0218343 A1* | 8/2018 | Kolb | G06Q 20/405 |
| 2018/0218455 A1 | 8/2018 | Kolb et al. | |
| 2018/0247376 A1* | 8/2018 | Sharma | G06Q 40/08 |
| 2018/0260909 A1 | 9/2018 | Li | |
| 2018/0285979 A1* | 10/2018 | Chessell | G06Q 40/08 |
| 2019/0005685 A1* | 1/2019 | Mu | G06T 11/003 |
| 2019/0172059 A1* | 6/2019 | Castagna | G06F 16/288 |
| 2019/0304027 A1* | 10/2019 | Hu | G06F 16/27 |
| 2019/0311437 A1* | 10/2019 | Sivakumar | G06Q 40/08 |
| 2019/0370905 A1 | 12/2019 | Hu | |
| 2020/0027080 A1* | 1/2020 | Holland | H04L 9/3255 |
| 2020/0279259 A1* | 9/2020 | Zhou | G06Q 20/3678 |
| 2021/0166193 A1* | 6/2021 | Ma | G06Q 10/10 |
| 2021/0233068 A1* | 7/2021 | Watanabe | G06Q 20/389 |

FOREIGN PATENT DOCUMENTS

| | | | |
|---|---|---|---|
| CN | 108596771 A | 9/2018 | |
| CN | 108629565 A | 10/2018 | |
| CN | 108776936 | * 11/2018 | G06Q 40/08 |
| CN | 108776936 A | 11/2018 | |
| CN | 108876401 A | 11/2018 | |
| CN | 110047008 A | 7/2019 | |
| TW | 201833827 A | 9/2018 | |

OTHER PUBLICATIONS

L. Bader, J. C. Burger, R. Matzuttand K. Wehrle, "Smart Contract-Based Car Insurance Policies," 2018 IEEE Globecom Workshops (GC Wkshps), 2018, pp. 1-7, (Year: 2018).*

Gateschi, Valentina etal, "Blockchain and Smart Contracts for Insurance: Is the Technology Mature Enough?", Future Internet, vo. 10, No. 20, 2018, pp. 1-16. (Year: 2018).*

M. Raikwar, S. Mazumdar, S. Ruj, S. Sen Gupta, A. Chattopadhyay and K.-Y. Lam, "A Blockchain Framework for Insurance Processes," 2018 9th IFIP International Conference on New Technologies, Mobility and Security (NTMS), 2018, pp. 1-4. (Year: 2018).*

First Search for Chinese Application No. 201811548128.6 dated Jan. 20, 2020.

Written Opinion and International Search Report for PCT Application No. PCT/CN2019/114356 dated Feb. 12, 2020.

Search Report for Taiwanese Applciation No. 108135857 dated May 25, 2020.

International Preliminary Report on Patentability Chapter I for PCT Application No. PCT/CN2019/114356 dated Jul. 1, 2021.

* cited by examiner

CLAIM SETTLEMENT METHOD AND APPARATUS EMPLOYING BLOCKCHAIN TECHNOLOGY

CROSS REFERENCE TO RELATED APPLICATION

The present application is a continuation application of the International Patent Application No. PCT/CN2019/114356, filed on Oct. 30, 2019, and titled "CLAIM SETTLEMENT METHOD AND APPARATUS EMPLOYING BLOCKCHAIN TECHNOLOGY," which claims priority to Chinese Patent Application No. 201811548128.6 filed on Dec. 18, 2018. The entire contents of all of the above applications are incorporated herein by reference in their entirety.

TECHNICAL FIELD

This application relates to the field of data processing technologies, and in particular, to a blockchain-based claim settlement method and apparatus.

BACKGROUND

A blockchain technology, also referred to as a distributed ledger technology, is an emerging technology in which a plurality of computing devices jointly participate in "ledger recording" and maintain a complete distributed database. Because the blockchain technology is characterized by decentralization, openness, and transparency, allowing each computing device to participate in database recording, and allowing rapid data synchronization among the computing devices, the blockchain technology has been widely applied in many fields.

SUMMARY

This application provides a blockchain-based claim settlement method, which is applicable to a blockchain including a node device of an insurer and a node device of an insured party, a first smart contract for insurance claim settlement is deployed in the blockchain, and the method includes: obtaining a first transaction for settling a claim of the insured party, where the first transaction includes claim settlement event data corresponding to the insured party; and calling a first smart contract, executing an insurance claim settlement logic declared in the first smart contract and corresponding to the insured party, and settling the claim of the insured party based on the claim settlement event data.

In some embodiments, the settling the claim of the insured party based on the claim settlement event data includes: sending a claim settlement scheme transaction for the insured party to the blockchain.

In some embodiments, the settling the claim of the insured party based on the claim settlement event data includes: calculating a claim settlement amount based on the claim settlement event data; and transferring an asset certificate corresponding to the claim settlement amount to a blockchain account of the insured party.

In some embodiments, the insurer and the insured party have signed an insurance claim settlement contract, and the insurance claim settlement contract includes an insurance claim settlement rule corresponding to the insured party; and the first smart contract is generated based on the insurance claim settlement contract.

In some embodiments, the method further includes: obtaining a second transaction generated based on the insurance claim settlement contract; and calling the first smart contract, executing a generation logic of the insurance claim settlement logic declared in the first smart contract, and generating the insurance claim settlement logic corresponding to the insured party in the first smart contract based on the insurance claim settlement rule corresponding to the insured party.

In some embodiments, the method further includes: obtaining a third transaction generated based on the insurance claim settlement contract; calling a second smart contract, executing a first smart contract generation logic declared in the second smart contract, and generating the first smart contract corresponding to the insured party based on the insurance claim settlement contract; and sending the first smart contract to the blockchain, to enable the first smart contract, after being verified in consensus by node devices of the blockchain, to be deployed in the blockchain.

In some embodiments, the first transaction further includes insurance claim settlement logic identification information.

In some embodiments, the blockchain is a consortium blockchain, and the node device of the insurer is a node device of a consortium member of the consortium blockchain.

Correspondingly, this application further provides a blockchain-based claim settlement apparatus, which is applicable to a blockchain including a node device of an insurer and a node device of an insured party, a first smart contract for insurance claim settlement is deployed in the blockchain, and the apparatus includes: an obtaining unit, configured to obtain a first transaction for settling a claim of the insured party, where the first transaction includes claim settlement event data corresponding to the insured party; and an execution unit, configured to call a first smart contract, execute an insurance claim settlement logic declared in the first smart contract and corresponding to the insured party, and settle the claim of the insured party based on the claim settlement event data.

In some embodiments, the execution unit is configured to: send a claim settlement scheme transaction for the insured party to the blockchain, to enable the claim settlement scheme transaction, after being verified in consensus by node devices of the blockchain, to be recorded in a distributed database of the blockchain.

In some embodiments, the execution unit is configured to: calculate a claim settlement amount based on the claim settlement event data; and transfer an asset certificate corresponding to the claim settlement amount to a blockchain account of the insured party.

In some embodiments, the insurer and the insured party have signed an insurance claim settlement contract, and the insurance claim settlement contract includes an insurance claim settlement rule corresponding to the insured party; and the first smart contract is generated based on the insurance claim settlement contract.

In some embodiments, the obtaining unit is configured to obtain a second transaction generated based on the insurance claim settlement contract; the execution unit is configured to call the first smart contract, execute a generation logic of the insurance claim settlement logic declared in the first smart contract, and generate the insurance claim settlement logic corresponding to the insured party in the first smart contract based on the insurance claim settlement rule corresponding to the insured party.

In some embodiments, the apparatus further includes a sending unit, the obtaining unit is configured to obtain a third transaction generated based on the insurance claim settlement contract; the execution unit is configured to call a second smart contract, execute a first smart contract generation logic declared in the second smart contract, and generate the first smart contract corresponding to the insured party based on the insurance claim settlement contract; and the sending unit is configured to send the first smart contract to the blockchain, to enable the first smart contract, after being verified in consensus by node devices of the blockchain, to be deployed in the blockchain.

In some embodiments, the first transaction further includes insurance claim settlement logic identification information.

In some embodiments, the blockchain is a consortium blockchain, and the node device of the insurer is a node device of a consortium member of the consortium blockchain.

In some embodiments, a blockchain-based claim settlement method comprises: obtaining a first transaction for settling a claim of the insured party, wherein the first transaction comprises claim settlement event data corresponding to the insured party; and calling the first smart contract, executing an insurance claim settlement logic declared in the first smart contract and corresponding to the insured party, and settling the claim of the insured party based on the claim settlement event data. sending a claim settlement scheme transaction for the insured party to the blockchain.

This application further provides a computer device, including a memory and a processor, where the memory stores computer programs executable by the processor, and the processor, when executing the computer programs, performs the blockchain-based claim settlement method described above.

It may be learned from the technical solutions that, according to the blockchain-based claim settlement method and apparatus provided in this application, an insurer and an insured party are set as nodes of a blockchain, and a claim of the insured party is automatically settled by calling a first smart contract which is deployed in the blockchain and in which an insurance claim settlement logic corresponding to the insured party is declared.

DETAILED DESCRIPTION

The exemplary embodiments are described herein in detail, and examples of the embodiments are shown in the accompanying drawings. When the following description involves the accompanying drawings, unless otherwise indicated, the same numerals in different accompanying drawings represent the same or similar elements. The implementations described in the following exemplary embodiments are not all the implementations consistent with one or more embodiments of this application, but instead are merely examples that are described in detail in the appended claims and are consistent with some aspects of the apparatuses and methods in one or more embodiments of this application.

In some embodiments, the steps of corresponding methods are not necessarily performed according to sequences shown and described in this application. In some other embodiments, the methods may include more or fewer steps than those described in this application. In addition, a single step described in this application may be divided into multiple steps for description in other embodiments, and multiple steps described in this application may be combined into a single step for description in other embodiments.

With the social and economic development and increasing insurance awareness among people, more users purchase various insurance products. During insurance claim settlement, due to a variety of complex insurance rules stipulated in an insurance contract, it is difficult for users to fully understand the insurance rules, and claim settlement often fails because insurance terms are not satisfied, which wastes time and energy of insured users and an insurance claim settlement institution, causing economic waste.

Figure 1:
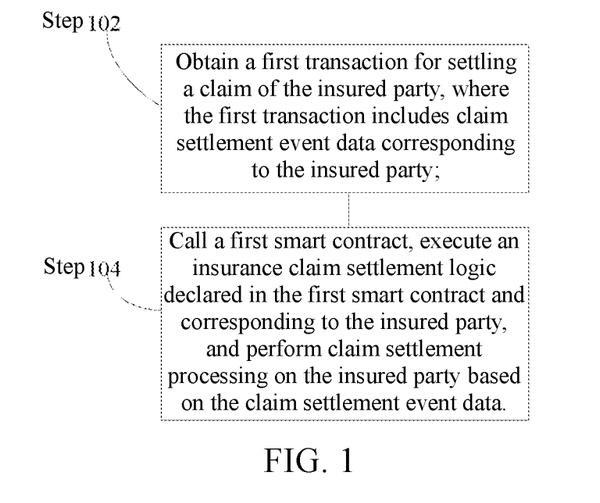
FIG. 1 is a flowchart of a blockchain-based claim settlement method, according to an embodiment of this specification.

FIG. 1 is a flowchart of a blockchain-based claim settlement method, according to an exemplary embodiment of this application. The blockchain includes a node device of an insurer and a node device of an insured party, and a first smart contract for insurance claim settlement is deployed in the blockchain.

In this embodiment, the blockchain may refer to a P2P network system that is formed by nodes through a consensus mechanism and that has a distributed data storage structure. Data in the blockchain is distributed in temporally connected blocks. Each block includes a data digest of a previous block, and full data backup of all or some nodes is achieved according to different consensus mechanisms (for example, PoW, PoS, DPoS, or PBFT). A person skilled in the art knows that, a blockchain system runs based on a corresponding consensus mechanism, and data that has been recorded in a blockchain database is difficult to be tampered with by any node. For example, to tamper with existing data in a blockchain using a PoW consensus, it requires at least 51% of computing power of the entire network. Therefore, the blockchain system has characteristics of ensuring data security and being anti-attack and tamper-proof, which are unmatched by other centralized database systems. Accordingly, in the embodiments provided in this application, data recorded in a distributed database of the blockchain is protected from attacks or tampering, thereby ensuring that code data corresponding to an insurance claim settlement logic declared in the first smart contract is true and accurate.

In this embodiment, the node devices of the insurer and the insured party may be added to the blockchain by following a corresponding node protocol and installing an application running the node protocol, to be used as nodes of the blockchain. A person skilled in the art usually refers to a node device having full data backup of a distributed database of a blockchain as a full node and refers to a node device having backup of partial data (for example, only data of a block header) of the distributed database of the blockchain as a light node or a client. In this embodiment, the node devices of the insurer and the insured party may include the full node, the light node, or the client. Any device that is directly or indirectly connected to the blockchain and can send or obtain data of the distributed database of the blockchain may be referred to as the node device in this embodiment.

In addition, an identity of a party deploying the first smart contract for insurance claim settlement is not limited in this embodiment. The first smart contract may be deployed on the blockchain by an insurer that provides insurance for an insured party, or may be deployed on the blockchain by a dedicated user in a blockchain, for example, an insurance claim settlement union organization or supervisory organization or a management organization of an insurance claim settlement smart contract, or may be deployed on the blockchain by another user or a smart contract.

In some embodiments, the blockchain-based claim settlement method includes the following steps.

Step 102. Obtaining a first transaction for settling a claim of the insured party, where the first transaction includes claim settlement event data corresponding to the insured party.

In this embodiment, the insurer may include an institution for issuing an insurance product and an institution for checking and settling a claim of event data of a claim settlement application, for example, independent insurance companies and a claim settlement service platform institution set collectively by a plurality of insurance companies. In this embodiment, the insured party may include a user that purchases insurance and applies for claim settlement based on occurrence of an insured event, or may include a user who is a beneficiary of an insurance contract but does not purchase insurance, or the like.

A transaction described in this application refers to a piece of data that is created by users through node devices of a blockchain and that needs to be finally published to a distributed database of the blockchain. The transaction in the blockchain includes a transaction in a narrow sense and a transaction in a broad sense. The transaction in a narrow sense refers to a value transfer issued by the user to the blockchain. For example, in a traditional Bitcoin blockchain network, a transaction may be a transfer initiated by a user in the blockchain. The transaction in a broad sense refers to a piece of service data with a service intent issued by the user to the blockchain. For example, a transaction may be a service (for example, a renting service, a vehicle scheduling service, an insurance claim settlement service, a credit service, and a medical service) message or a service request with a service intent that is issued by the user in the blockchain and that is not related to value transfer. In this embodiment, the first transaction is service data that includes the claim settlement event data corresponding to the insured party and is used for calling a smart contract.

According to the foregoing embodiments provided in this application, the first transaction may be generated and sent by an insurer based on claim settlement event data corresponding to an insured party after receiving a claim settlement application of the insured party, or may be directly generated and sent by an insured party based on data of a claim settlement event that has happened, or may be generated and sent by a service institution that generates and records the claim settlement event data, for example, a medical institution that generates and records user medical treatment event data or a vehicle maintenance institution that generates and records a vehicle maintenance event. An identity of a user that sends the first transaction is not limited in this application. The claim settlement event data corresponding to the insured party included in the first transaction is event data based on which the insured party applies to the insurer for claim settlement, for example, medical record information corresponding to an insured party user that has medical insurance or health insurance, maintenance record information of an insured vehicle corresponding to an insured user that has vehicle insurance, or a real estate accident record corresponding an insured user that has real estate insurance.

Step 104. Calling a first smart contract, executing an insurance claim settlement logic declared in the first smart contract and corresponding to the insured party, and settling the claim of the insured party based on the claim settlement event data.

A smart contract is usually a computer-executable program that is deployed on a blockchain after being compiled. The smart contract needs to be verified in consensus by blockchain nodes before being deployed on the blockchain. In this embodiment, the first smart contract in which the insurance claim settlement logic corresponding to the insured party is declared may be recorded in the distributed database of the blockchain after being verified in consensus by the blockchain nodes, and the consensus nodes on the blockchain jointly supervise and verify settings of the insurance claim settlement logic. In some embodiments, the "logic" described in this specification may refer to an algorithm or executable instructions in the form of computer code or the like.

After obtaining the first transaction, the node devices of the blockchain call a first smart contract to which the first transaction points (calling is performed based on a smart contract address and a function interface included in the first transaction). Each node device may call the first smart contract based on the first transaction, execute insurance claim settlement calculation, and generate a result of the calling and execution, that is, settle the claim of the insured party. Similarly, after the result of calling and executing the first smart contract (that is, settling the claim of the insured party) is verified in consensus by the blockchain nodes, the execution result may be recorded in the distributed database of the blockchain for storage.

In this embodiment, a consensus mechanism used in the consensus verification of the blockchain nodes may include proof of work (PoW), proof of stake (PoS), delegated proof of stake (DPoS), or the like. The consensus mechanism PoS or DPoS is similar to PoW.

In some embodiments, to reduce the confirming time of transactions or data, improve a transaction throughput, and meet security and performance requirements, the blockchain may be alternatively constructed by using a consortium blockchain architecture in this embodiment of this application. An insurance service company or an insurance union platform, which serves as an insurer, and a supervisory organization (for example, a government agency of an Insurance Regulatory Commission) for insurance and claim settlement actions may be used as member node devices of the consortium blockchain, and participate in accounting of blocks as preselected nodes of the consortium blockchain. A consensus process of the consortium blockchain is also controlled by the preselected nodes. When nodes over a specified ratio (for example, 2/3) on the network confirm a block, a transaction or data recorded in the block is confirmed in consensus by the entire network.

A consensus algorithm such as proof of stake, PBFT, or RAFT is usually adopted by the consortium blockchain. The PBFT algorithm is an example of the consensus algorithm of the consortium blockchain provided in this application, because the algorithm achieves a high efficiency in reaching a consensus, and can meet a requirement of high-frequency transaction volume. For example, in this embodiment, insured parties frequently generate claim settlement event data, and correspondingly, node devices of the blockchain frequently send first transactions for claim settlement processing to the blockchain. The PBFT algorithm achieves a low delay in reaching a consensus, and basically meets a requirement of real-time processing, so as to rapidly record the first transaction in a new block of the blockchain in real time. In addition, a trusted node in the consortium blockchain network is used as a preselected accounting node, achieving both security and stability. In addition, the PBFT algorithm does not consume excessive computing power resources of a computer, and token circulation is not necessarily required, thereby achieving good usability.

After the blockchain node calls and executes the first smart contract based on the first transaction, the operation of settling the claim of the insured party may be completed based on the claim settlement event data. In this embodiment, the claim settlement for the insured party is executed based on the calling of the first smart contract, thereby achieving high processing efficiency. The smart contract may respond to a call request of a corresponding user at any time (without waiting and making an appointment for a working time of an insurance claim settlement company as in a traditional mode), thereby greatly improving claim application processing efficiency. Moreover, because logical terms of the smart contract are verified in consensus by the blockchain node and are tamper-proof, an execution result is fair and visible, thereby avoiding defects such as a possible calculation error in a claim settlement result in the traditional mode, and it is unnecessary to supervise or arbitrate the fairness of the claim settlement result. Further, the claim of the insured party is settled by using the first smart contract, thereby greatly reducing manpower and time costs required for application and execution of the claim settlement in the traditional mode and achieving good economic efficiency.

In some embodiments, the claim of the insured party may be settled in a plurality of manners.

In some embodiments, the settling the claim of the insured party may include: sending a claim settlement scheme transaction for the insured party to the blockchain, where the claim settlement scheme transaction may include content such as a claim settlement amount obtained through calculation based on the claim settlement event data, and a delivery time and a delivery manner of the claim settlement amount, or may include content such as a claim rejection notification message obtained through calculation based on the claim settlement event data. The claim settlement scheme obtained by executing the first smart contract may be stored in the distributed database of the blockchain for nodes of the blockchain, such as an insured party, an insurance supervisory organization, and a judicial institution, to query and extract evidence.

In some embodiments, the settling the claim of the insured party based on the claim settlement event data includes: calculating a claim settlement amount based on the claim settlement event data; and remitting (or transferring) an asset certificate corresponding to the claim settlement amount to a blockchain account of the insured party. The asset certificate may correspond to a smart asset such as a token or a digital asset in the blockchain, or may correspond to an off-chain asset such as cash, security, coupon, or real estate outside the blockchain. This is not limited in this application. A person skilled in the art should learn that the foregoing operation of remitting (or transferring) an asset certificate corresponding to the claim settlement amount to a blockchain account of the insured party may be recorded in the distributed database of the blockchain in a form of a transfer transaction. According to the claim settlement method provided in this embodiment, when the asset certificate is the digital asset circulating in the blockchain, an operation of issuing a claim settlement asset is directly completed on the blockchain. When the asset certificate is an asset outside the blockchain, a certificate of the claim settlement asset is issued on the blockchain. Therefore, compared with the claim settlement method in which the claim settlement scheme is generated on the blockchain provided in the foregoing embodiment, the claim settlement method provided in this embodiment has a higher service processing efficiency.

In a traditional mode, when purchasing insurance, a user usually signs an insurance claim settlement contract, or referred to as a "policy," with an insurance company and initiates a claim settlement application to the insurance company based on an insurance claim settlement rule (which may include content such as conditions that a claim settlement event needs to meet, a claim settlement duration, and a claim settlement amount) corresponding to the insured party stipulated in the insurance claim settlement contract. Therefore, in the one or more embodiments above, the first smart contract may be directly compiled and generated and then wait for being verified in consensus by the node devices of the insured party and the insurer, to be recorded in the distributed database of the blockchain, or may be generated based on the insurance claim settlement contract. For example, code corresponding to an insurance claim settlement logic declared in a smart contract is compiled based on an insurance claim settlement rule included in the insurance claim settlement contract, or the insurance claim settlement rule corresponding to the insured party is imported into an insurance claim settlement contract template, and the first smart contract is directly generated by using the contract template. After being generated, the first smart contract may be compiled and deployed onto the blockchain.

In some embodiments, the first smart contract may have a function of generating a computer-executable insurance claim settlement logic according to the insurance claim settlement rule specified in the insurance claim settlement contract. Therefore, in the foregoing embodiments, a process of generating the insurance claim settlement logic declared in the first smart contract includes: obtaining, by a node of the blockchain, a second transaction generated based on the insurance claim settlement contract; and calling the first smart contract, executing a generation logic of the insurance claim settlement logic declared in the first smart contract, and generating the insurance claim settlement logic corresponding to the insured party in the first smart contract based on the insurance claim settlement rule corresponding to the insured party. That is, the first smart contract may be used as an insurance claim settlement contract template on the blockchain and performs, after being called by the second transaction generated based on the insurance claim settlement contract, an operation of generating an insurance claim settlement logic corresponding to the insured party on the blockchain, and code of the generated insurance claim settlement logic is updated into code of the first smart contract.

To ensure fairness and security of a smart contract, a blockchain user having a permission to update the first smart contract may be specified by the first smart contract, for example, an insurance company and an insurance union.

In some embodiments, the first smart contract may be further generated and deployed onto the blockchain by another smart contract. A process of generating the first smart contract includes: obtaining, by the node devices of the blockchain, a third transaction generated based on the insurance claim settlement contract; calling a second smart contract, executing a first smart contract generation logic declared in the second smart contract, and generating the first smart contract corresponding to the insured party based on the insurance claim settlement contract; and sending the first smart contract to the blockchain, to enable the first smart contract, after being verified in consensus by node devices of the blockchain, to be deployed in the blockchain. To support the first smart contract to be generated and deployed onto the blockchain, the second smart contract generally has a code compiling function, an electronic signature function, and the like.

It may be learned from the process of generating the first smart contract described in the foregoing embodiments that the first smart contract may perform claim settlement processing for a plurality of insured parties or a plurality of insurance claim settlement logics. For example, when a smart contract is deployed outside the blockchain, insurance claim settlement logics in insurance claim settlement contracts of a plurality of insured parties are compiled into code of the first smart contract. Alternatively, corresponding second transactions are generated based on a plurality of insurance claim settlement contracts of a plurality of insured parties, and after being called by the second transaction, a plurality of insurance claim settlement logics of the plurality of insured parties are updated into the code of the first smart contract. When the first smart contract corresponds to a plurality of insured parties or a plurality of insurance claim settlement logics, to facilitate query of an insurance claim settlement logic corresponding to an insured party, the first transaction may further include insurance claim settlement logic identification information, and the insurance claim settlement logic identification information may be represented as identity identification information of the insured party, unique encoding information of the insurance claim settlement contract, unique identification information of the insurance claim settlement logic, or the like.

Figure 3:
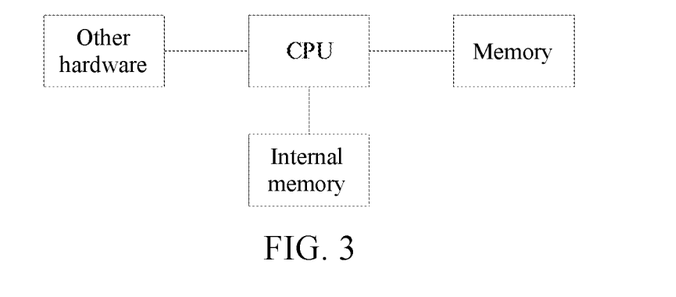
FIG. 3 is a structural diagram of hardware running a blockchain-based claim settlement apparatus, according to an embodiment of this specification.

Corresponding to the above process implementation, embodiments of this application further provide a blockchain-based claim settlement apparatus 20. The apparatus 20 may be implemented by software, or by hardware or a combination of software and hardware. Taking software implementation as an example, as a logical apparatus, the apparatus is formed by a central processing unit (CPU) of a device in which the apparatus is located reading corresponding computer program instructions into a memory for running. From a hardware level, in addition to a CPU, an internal memory, and a memory shown in FIG. 3, a device in which a network risk service implementation apparatus is located usually further includes other hardware such as a chip for sending and receiving a wireless signal, and/or other hardware such as a card for implementing a network communication function.

Figure 2:
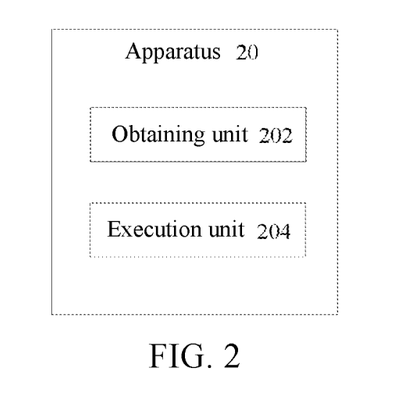
FIG. 2 is a schematic diagram of a blockchain-based claim settlement apparatus, according to an embodiment of this specification.

FIG. 2 shows a blockchain-based claim settlement apparatus 20, applicable to a blockchain including a node device of an insurer and a node device of an insured party, a first smart contract for insurance claim settlement is deployed in the blockchain, and the apparatus 20 includes: an obtaining unit 202, configured to obtain a first transaction for settling a claim of the insured party, where the first transaction includes claim settlement event data corresponding to the insured party; and an execution unit 204, configured to call a first smart contract, execute an insurance claim settlement logic declared in the first smart contract and corresponding to the insured party, and settle the claim of the insured party based on the claim settlement event data.

In some embodiments, the execution unit 204 is configured to: send a claim settlement scheme transaction for the insured party to the blockchain, to enable the claim settlement scheme transaction, after being verified in consensus by the node devices of the blockchain, to be recorded in a distributed database of the blockchain.

In some embodiments, the execution unit 204 is configured to: calculate a claim settlement amount based on the claim settlement event data; and transfer an asset certificate corresponding to the claim settlement amount to a blockchain account of the insured party.

In some embodiments, the insurer and the insured party have signed an insurance claim settlement contract, and the insurance claim settlement contract includes an insurance claim settlement rule corresponding to the insured party; and the first smart contract is generated based on the insurance claim settlement contract.

In some embodiments, the obtaining unit 202 is configured to obtain a second transaction generated based on the insurance claim settlement contract; the execution unit 204 is configured to call the first smart contract, execute a generation logic of the insurance claim settlement logic declared in the first smart contract, and generate the insurance claim settlement logic corresponding to the insured party in the first smart contract based on the insurance claim settlement rule corresponding to the insured party.

In some embodiments, the apparatus 20 further includes a sending unit (not show); the obtaining unit 202 is configured to obtain a third transaction generated based on the insurance claim settlement contract; the execution unit 204 is configured to call a second smart contract, execute a first smart contract generation logic declared in the second smart contract, and generate the first smart contract corresponding to the insured party based on the insurance claim settlement contract; and the sending unit is configured to send the first smart contract to the blockchain, to enable the first smart contract, after being verified in consensus by node devices of the blockchain, to be deployed in the blockchain.

In some embodiments, the first transaction further includes insurance claim settlement logic identification information.

In some embodiments, the blockchain is a consortium blockchain, and the node device of the insurer is a node device of a consortium member of the consortium blockchain.

In some embodiments, the various units or modules of the blockchain-based claim settlement apparatus 20 may be implemented as software instructions or a combination of software and hardware. For example, the blockchain-based claim settlement apparatus 20 (or referred to as a system) may comprise one or more processors (e.g., CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the blockchain-based claim settlement apparatus 20 may include a server, a mobile phone, a tablet computer, a PC, a laptop computer, or a combination of one or more of these computing devices. The blockchain-based claim settlement apparatus 20 may include a virtual machine.

Reference may be made to the implementation processes of corresponding steps in the foregoing method for details of the implementation processes of the functions and effects of the units in the apparatus, and for related parts, reference may be made to partial descriptions in the method embodiment. Details are not described herein again.

The described apparatus embodiment is merely an example. The units described as separate parts may or may not be physically separate, and parts displayed as units may or may not be physical modules, may be located in one position, or may be distributed on a plurality of network modules. Some or all of the units or modules may be selected according to actual requirements to achieve the objectives of the solutions of this application. A person of ordinary skill in the art may understand and implement the solutions without creative efforts.

The apparatus, the unit, or the module described in the foregoing embodiments may be, for example, implemented by a computer chip or entity, or a product with a specified function. A typical implementation device is a computer, and a specific form of the computer may be a personal computer, a laptop computer, a cellular phone, a camera phone, a smartphone, a personal digital assistant, a media player, a navigation device, an email device, a game console, a tablet computer, a wearable device, or a combination of any of these devices.

Corresponding to the foregoing method embodiment, the embodiments of this application further provide a computer device, and the computer device includes a memory and a processor. The memory stores a computer program executable by the processor. The processor, when executing the stored computer program, performs the steps of the blockchain-based claim settlement method in the embodiments of this application. For detailed descriptions of the steps of the blockchain-based claim settlement method, reference is made to the previous content, and details are not described herein again.

The foregoing descriptions are merely exemplary embodiments of this application, but are not intended to limit this application. Any modification, equivalent replacement, or improvement made without departing from the spirit and principle of this application should fall within the protection scope of this application.

In a typical configuration, the computer device includes one or more processors (CPUs), an input/output interface, a network interface, and a memory.

The memory may include a form such as a persistent memory, a random-access memory (RAM) and/or a non-transitory memory of computer readable media, for example, a read-only memory (ROM) or a flash memory (RAM). The memory is an example of the computer readable medium.

The computer readable medium includes a persistent medium and a non-persistent medium, a removable medium, and a non-removable medium, which may implement storage of information by using any method or technology. The information may be a computer readable instruction, a data structure, a module of a program or other data.

Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or any other magnetic storage device or any other non-transmission media that may be configured to store information that a computing device can access. Based on the definition in the present disclosure, the computer-readable medium does not include transitory computer readable media (transitory media), such as a modulated data signal and a carrier.

It should also be noted that the terms "include," "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

What is claimed is:

1. A method, applicable to a blockchain comprising a node device of an insurer and a node device of an insured party, a first smart contract comprising one or more logics for insurance claim settlement deployed in the blockchain, and the method comprising:
    obtaining, by the node device of the insurer, a second transaction generated based on an insurance claim settlement contract;
    calling, by the node device of the insurer, the first smart contract based on a smart contract address of the first smart contract, and executing, by the node device of the insurer, a generation logic of the first smart contract, and generating, by the generation logic, (i) an insurance claim settlement logic corresponding to the insured party in the first smart contract based on an insurance claim settlement rule corresponding to the insured party and (ii) a logic identifier for the generated insurance claim settlement logic;
    updating, by the node device of the insurer, the first smart contract to include the logic identifier in the first smart contract, wherein the first smart contract is updated to include a plurality of different logic identifiers corresponding to different insured parties;
    obtaining, by the node device of the insurer, a first transaction for settling a claim of the insured party, wherein the first transaction comprises an identifier of the insured party, the logic identifier, and claim settlement event data corresponding to the insured party; and
    calling, by the node device of the insurer, the first smart contract, identifying the insurance claim settlement logic in the first smart contract based on the identifier of the insured party and the logic identifier, executing, by the node device of the insurer, the insurance claim settlement logic in the first smart contract, and executing, by the insurance claim settlement logic, the claim of the insured party based on the claim settlement event data.

2. The method according to claim 1, wherein the executing the claim of the insured party based on the claim settlement event data comprises:

sending, by the node device of the insurer, a claim settlement scheme transaction for the insured party to the blockchain.

3. The method according to claim 1, wherein the executing the claim of the insured party based on the claim settlement event data comprises:
calculating, by the node device of the insurer using the insurance claim settlement logic, a claim settlement amount based on the claim settlement event data; and
transferring, by the node device of the insurer, an asset certificate corresponding to the claim settlement amount to a blockchain account of the insured party.

4. The method according to claim 1, wherein the insurer and the insured party have signed the insurance claim settlement contract, and the insurance claim settlement contract comprises the insurance claim settlement rule corresponding to the insured party; and
the first smart contract is generated based on the insurance claim settlement contract.

5. The method according to claim 4, further comprising:
obtaining, by the node device of the insurer, a third transaction generated based on the insurance claim settlement contract;
calling, by the node device of the insurer, a second smart contract and executing, by the node device of the insurer, a first smart contract generation logic in the second smart contract, and generating the first smart contract corresponding to the insured party based on the insurance claim settlement contract; and
sending, by the node device of the insurer, the first smart contract to the blockchain, to enable the first smart contract, after being verified in consensus by node devices of the blockchain, to be deployed in the blockchain.

6. The method according to claim 1, wherein the first transaction further comprises insurance claim settlement logic identification information.

7. The method according to claim 1, wherein the blockchain is a consortium blockchain, and the node device of the insurer is a node device of a consortium member of the consortium blockchain.

8. One or more non-transitory computer-readable storage media storing instructions executable by one or more processors, wherein execution of the instructions causes the one or more processors to perform operations comprising:
obtaining a second transaction generated based on an insurance claim settlement contract, wherein a blockchain comprises a node device of an insurer and a node device of an insured party, and wherein a first smart contract comprising one or more logics for insurance claim settlement is deployed in the blockchain;
calling the first smart contract based on a smart contract address of the first smart contract and executing a generation logic of the first smart contract, and generating, by the generation logic, (i) an insurance claim settlement logic corresponding to the insured party in the first smart contract based on an insurance claim settlement rule corresponding to the insured party and (ii) a logic identifier for the generated insurance claim settlement logic;
updating the first smart contract to include the logic identifier in the first smart contract, wherein the first smart contract is updated to include a plurality of different logic identifiers corresponding to different insured parties;
obtaining a first transaction for settling a claim of the insured party, wherein the first transaction comprises an identifier of the insured party, the logic identifier, and claim settlement event data corresponding to the insured party; and
calling the first smart contract, identifying the insurance claim settlement logic in the first smart contract based on the identifier of the insured party and the logic identifier, executing the insurance claim settlement logic in the first smart contract, and executing, by the insurance claim settlement logic, the claim of the insured party based on the claim settlement event data.

9. The one or more non-transitory computer-readable storage media according to claim 8, wherein the executing the claim of the insured party based on the claim settlement event data comprises:
sending a claim settlement scheme transaction for the insured party to the blockchain.

10. The one or more non-transitory computer-readable storage media according to claim 8, wherein the executing the claim of the insured party based on the claim settlement event data comprises:
calculating a claim settlement amount based on the claim settlement event data; and
transferring an asset certificate corresponding to the claim settlement amount to a blockchain account of the insured party.

11. The one or more non-transitory computer-readable storage media according to claim 8, wherein the insurer and the insured party have signed the insurance claim settlement contract, and the insurance claim settlement contract comprises the insurance claim settlement rule corresponding to the insured party; and
the first smart contract is generated based on the insurance claim settlement contract.

12. The one or more non-transitory computer-readable storage media according to claim 11, wherein the operations further comprise:
obtaining a third transaction generated based on the insurance claim settlement contract;
calling a second smart contract and executing a first smart contract generation logic in the second smart contract, and generating the first smart contract corresponding to the insured party based on the insurance claim settlement contract; and
sending the first smart contract to the blockchain, to enable the first smart contract, after being verified in consensus by node devices of the blockchain, to be deployed in the blockchain.

13. The one or more non-transitory computer-readable storage media according to claim 8, wherein the first transaction further comprises insurance claim settlement logic identification information.

14. The one or more non-transitory computer-readable storage media according to claim 8, wherein the blockchain is a consortium blockchain, and the node device of the insurer is a node device of a consortium member of the consortium blockchain.

15. A system comprising one or more processors and one or more non-transitory computer-readable memories coupled to the one or more processors and configured with instructions executable by the one or more processors to cause the system to perform operations comprising:
obtaining a second transaction generated based on an insurance claim settlement contract, wherein a blockchain comprises a node device of an insurer and a node device of an insured party, and wherein a first smart contract comprising one or more logics for insurance claim settlement is deployed in the blockchain;

calling the first smart contract based on a smart contract address of the first smart contract and executing a generation logic of the first smart contract, and generating, by the generation logic, (i) an insurance claim settlement logic corresponding to the insured party in the first smart contract based on an insurance claim settlement rule corresponding to the insured party and (ii) a logic identifier for the generated insurance claim settlement logic;

updating the first smart contract to include the logic identifier in the first smart contract, wherein the first smart contract is updated to include a plurality of different logic identifiers corresponding to different insured parties;

obtaining a first transaction for settling a claim of the insured party, wherein the first transaction comprises an identifier of the insured party, the logic identifier, and claim settlement event data corresponding to the insured party; and calling the first smart contract, identifying the insurance claim settlement logic in the first smart contract based on the identifier of the insured party and the logic identifier, executing the insurance claim settlement logic in the first smart contract, and executing, by the insurance claim settlement logic, the claim of the insured party based on the claim settlement event data.

16. The system according to claim 15, wherein the executing the claim of the insured party based on the claim settlement event data comprises:

sending a claim settlement scheme transaction for the insured party to the blockchain.

17. The system according to claim 15, wherein the executing the claim of the insured party based on the claim settlement event data comprises:

calculating a claim settlement amount based on the claim settlement event data; and transferring an asset certificate corresponding to the claim settlement amount to a blockchain account of the insured party.

18. The system according to claim 15, wherein the insurer and the insured party have signed the insurance claim settlement contract, and the insurance claim settlement contract comprises the insurance claim settlement rule corresponding to the insured party; and the first smart contract is generated based on the insurance claim settlement contract.

19. The system according to claim 18, wherein the operations further comprise:

obtaining a third transaction generated based on the insurance claim settlement contract;

calling a second smart contract and executing a first smart contract generation logic in the second smart contract, and generating the first smart contract corresponding to the insured party based on the insurance claim settlement contract; and sending the first smart contract to the blockchain, to enable the first smart contract, after being verified in consensus by node devices of the blockchain, to be deployed in the blockchain.

20. The system according to claim 15, wherein the first transaction further comprises insurance claim settlement logic identification information.

* * * * *